United States Patent
Twohig et al.

(10) Patent No.: US 12,001,675 B1
(45) Date of Patent: Jun. 4, 2024

(54) METHOD AND APPARATUS FOR SUPPORTING CONTROL WINDOWS

(71) Applicant: Dell Products L.P., Round Rock, TX (US)

(72) Inventors: Aaron T. Twohig, Rathpeacon (IE); Daryl F. Kinney, Hopkinton, MA (US); Sean Cronin, Midleton (IE); Subramanian Venkatraman, Bangalore (IN); Nagesam Pooni, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 18/157,268

(22) Filed: Jan. 20, 2023

(51) Int. Cl.
*G06F 3/00* (2006.01)
*G06F 3/06* (2006.01)

(52) U.S. Cl.
CPC .......... *G06F 3/0604* (2013.01); *G06F 3/0629* (2013.01); *G06F 3/067* (2013.01)

(58) Field of Classification Search
None
See application file for complete search history.

(56) References Cited

U.S. PATENT DOCUMENTS 11,449,443 B2 * 9/2022 Kragel ................ G06F 13/4282

\* cited by examiner

Primary Examiner — Midys Rojas
(74) Attorney, Agent, or Firm — DALY, CROWLEY, MOFFORD & DURKEE, LLP

(57) ABSTRACT

A method comprising: receiving, at a management application, a first definition of a control window, the first definition specifying the control window in a local time of a time zone where the management application is being executed, wherein the first definition identifies: (i) a first start time for the control window, (ii) a first end time for the control window, and (iii) one or more days of the week when the control window should be enforced; detecting an applicable time in the time zone, the applicable time being one of standard time or daylight savings time; generating a second definition of the control window that corresponds to the applicable time, the second definition specifying the control window in a standardized time format, the second definition being generated based on the first definition; and causing the control window to be enforced in a storage array in accordance with the second definition.

20 Claims, 7 Drawing Sheets

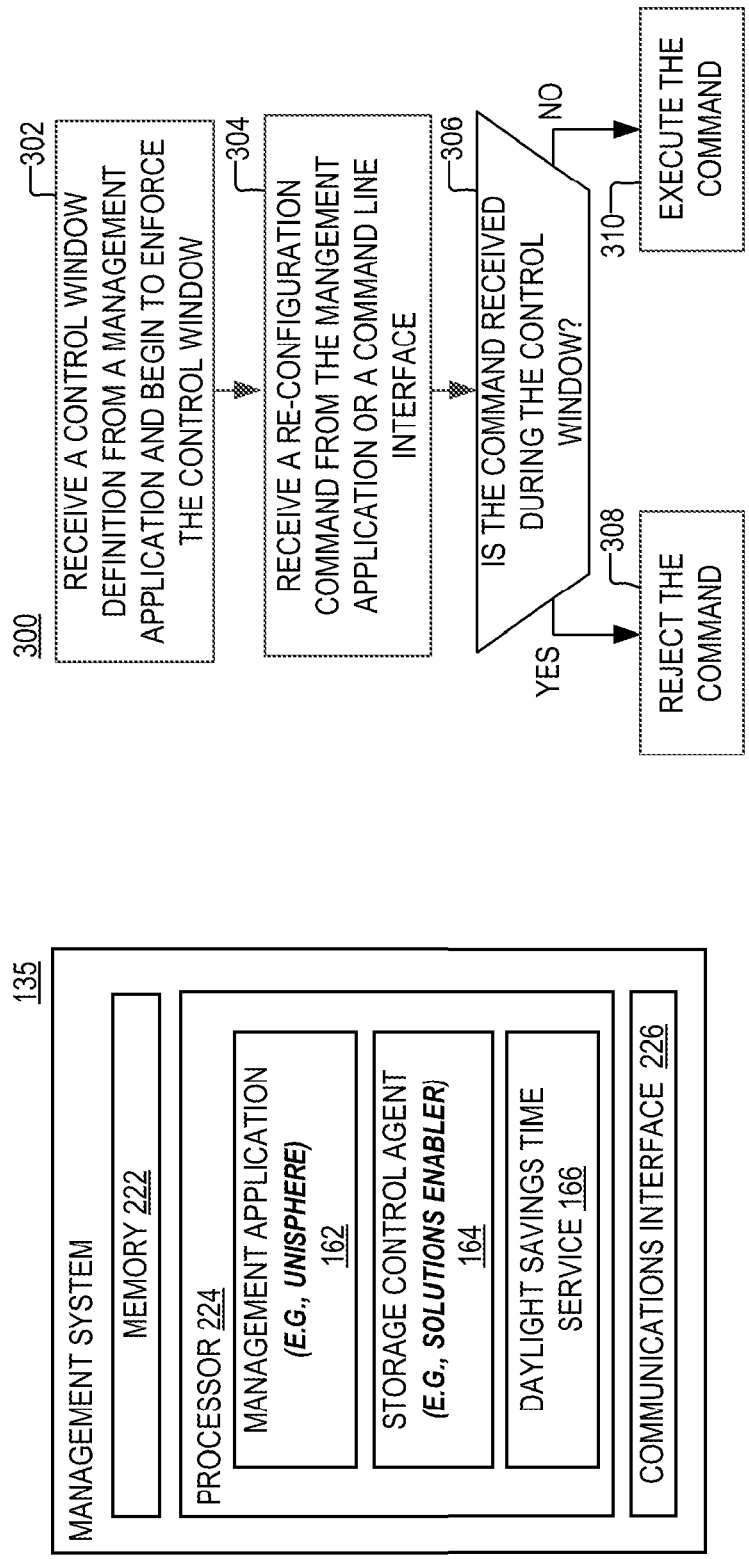

METHOD AND APPARATUS FOR SUPPORTING CONTROL WINDOWS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method comprising: receiving, at a management application, a first definition of a control window, the first definition specifying the control window in a local time of a time zone where the management application is being executed, wherein the first definition identifies: (i) a first start time for the control window, (ii) a first end time for the control window, and (iii) one or more days of the week when the control window should be enforced; detecting an applicable time in the time zone, the applicable time being one of standard time or daylight savings time; generating a second definition of the control window that corresponds to the applicable time, the second definition specifying the control window in a standardized time format, the second definition being generated based on the first definition; causing the control window to be enforced in a storage array in accordance with the second definition; detecting an event indicating that the applicable time, in the time zone, will change to a new applicable time, the new applicable time being the other one of standard time and daylight savings time; and in response to the event, stopping to enforce the control window in the storage array in accordance with the second definition and causing the control window to be enforced in the storage array in accordance with a third definition of the control window, the third definition being in the standardized time format.

According to aspects of the disclosure, a system is provided, comprising: a memory; and at least one processor that is operatively coupled to the memory, the at least one processor being configured to perform the operations of: receiving, at a management application, a first definition of a control window, the first definition specifying the control window in a local time of a time zone where the management application is being executed, wherein the first definition identifies: (i) a first start time for the control window, (ii) a first end time for the control window, and (iii) one or more days of the week when the control window should be enforced; detecting an applicable time in the time zone, the applicable time being one of standard time or daylight savings time; generating a second definition of the control window that corresponds to the applicable time, the second definition specifying the control window in a standardized time format, the second definition being generated based on the first definition; causing the control window to be enforced in a storage array in accordance with the second definition; detecting an event indicating that the applicable time, in the time zone, will change to a new applicable time, the new applicable time being the other one of standard time and daylight savings time; and in response to the event, stopping to enforce the control window in the storage array in accordance with the second definition and causing the control window to be enforced in the storage array in accordance with a third definition of the control window, the third definition being in the standardized time format.

According to aspects of the disclosure, a non-transitory computer-readable medium storing one or more processor-executable instructions, which, when executed by at least one processor, cause the at least one processor to perform the operations of: receiving, at a management application, a first definition of a control window, the first definition specifying the control window in a local time of a time zone where the management application is being executed, wherein the first definition identifies: (i) a first start time for the control window, (ii) a first end time for the control window, and (iii) one or more days of the week when the control window should be enforced; detecting an applicable time in the time zone, the applicable time being one of standard time or daylight savings time; generating a second definition of the control window that corresponds to the applicable time, the second definition specifying the control window in a standardized time format, the second definition being generated based on the first definition; causing the control window to be enforced in a storage array in accordance with the second definition; detecting an event indicating that the applicable time, in the time zone, will change to a new applicable time, the new applicable time being the other one of standard time and daylight savings time; and in response to the event, stopping to enforce the control window in the storage array in accordance with the second definition and causing the control window to be enforced in the storage array in accordance with a third definition of the control window, the third definition being in the standardized time format.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2C is a diagram of an example of a management system, according to aspects of the disclosure;

FIG. 3 is a flowchart of an example of a process, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
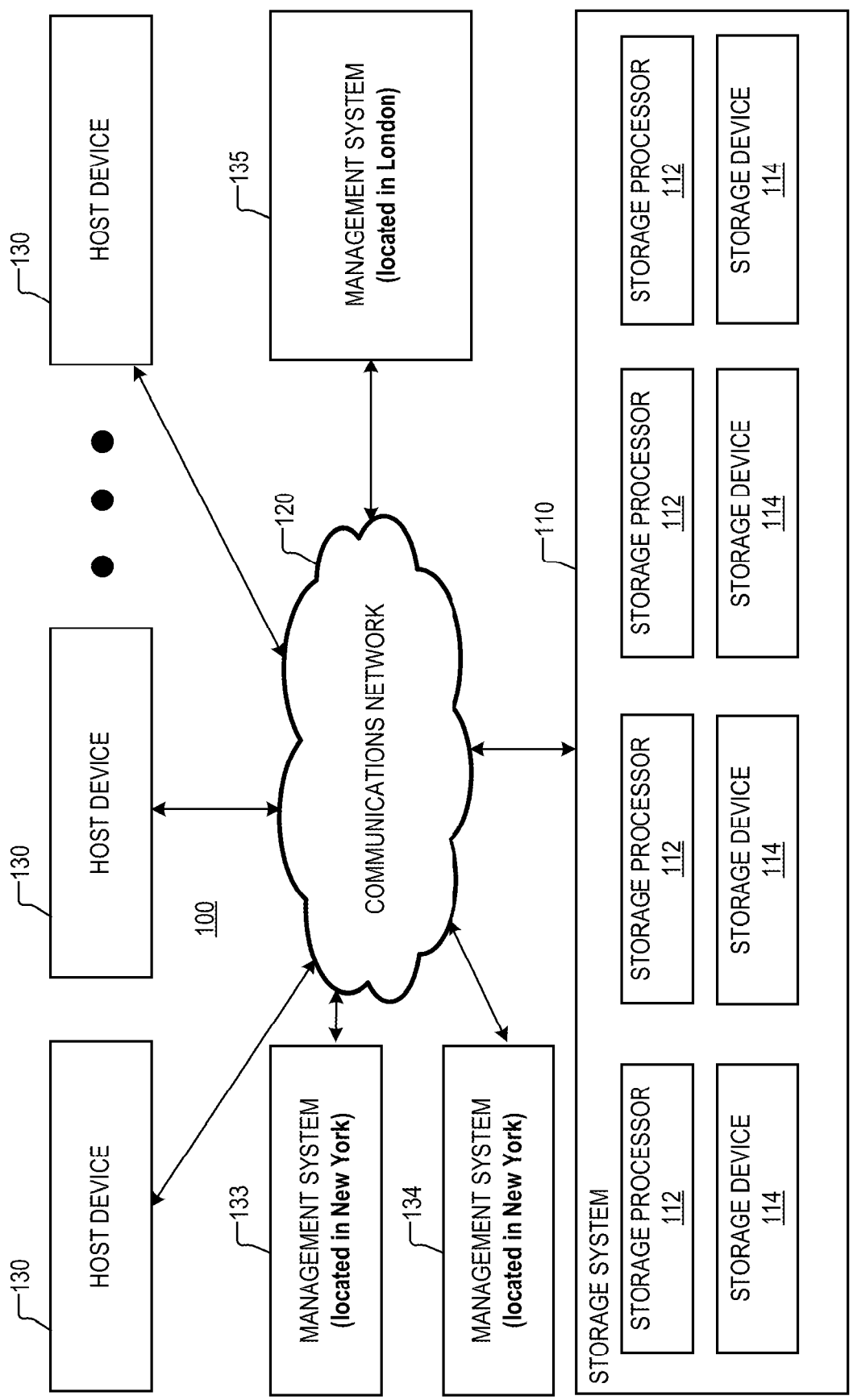
FIG. 1 is a diagram of an example of a system, according to aspects of the disclosure.

FIG. 1 is a diagram of an example of a system 100, according to aspects of the disclosure. As illustrated, the system 100 may include a storage system 110, a communications network 120, a management system 133, a management system 134, a management system 135, and a plurality of host devices 130.

Figure 7:
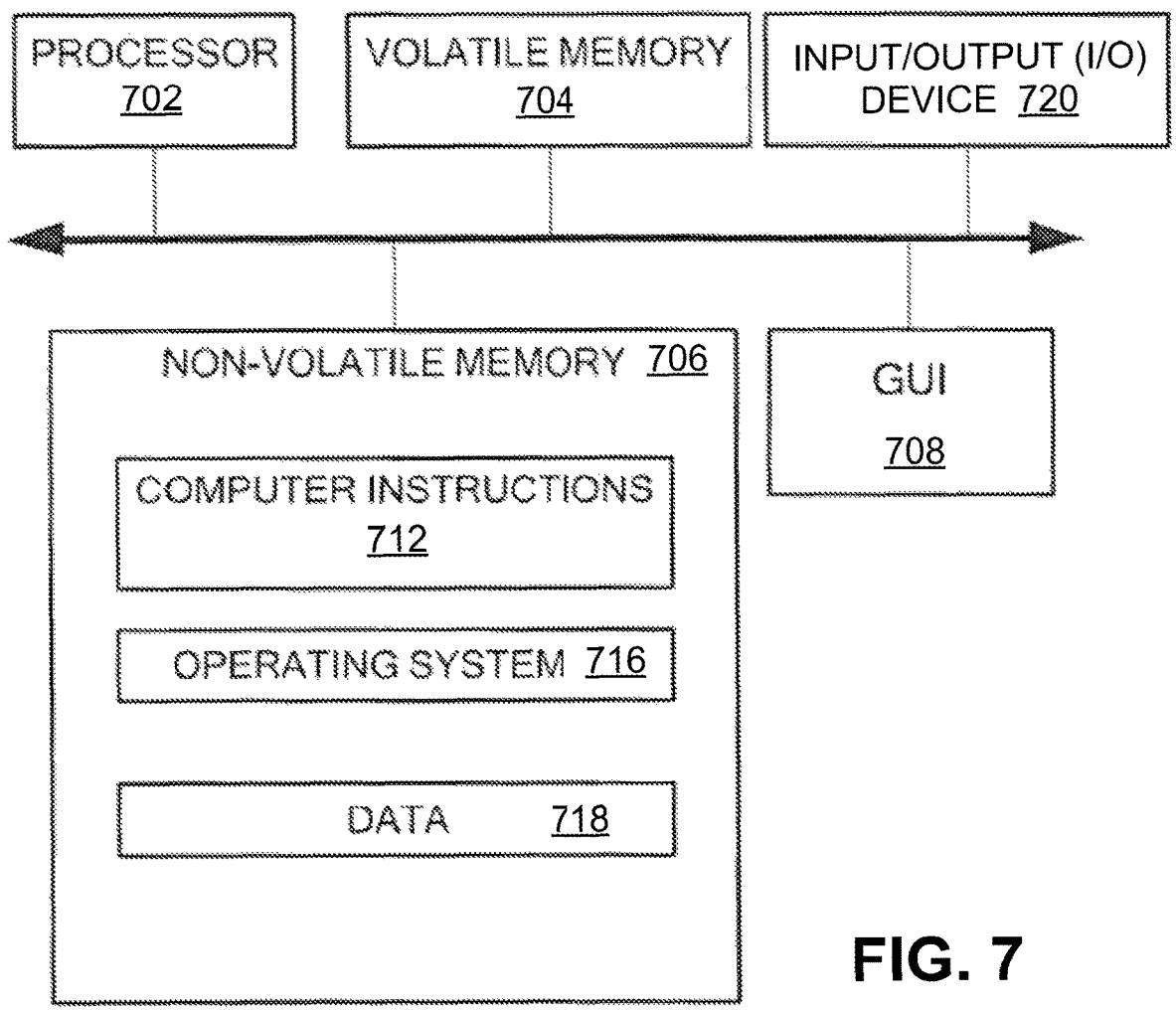
FIG. 7 is a diagram of an example of a computing device, according to aspects of the disclosure.

The storage system 110 may include a plurality of storage processors 112 and a plurality of storage devices 114. Each of the storage processors may include a computing device that is configured to receive I/O requests from any of the host devices 130 and execute the received I/O requests by reading or writing to the storage devices 114. In some implementations, each of the storage processors 112 may have an architecture that is the same or similar to the architecture of the computing device 700, which is shown in FIG. 7. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, the storage devices 114 may be arranged in one or more Redundant Array of Independent Disks (RAID) arrays. The storage processors 112 may be located in the same geographic location or in different geographic locations. Similarly, the storage devices 114 may be located in the same geographic location or different geographic locations.

The communications network 120 may include one or more of the Internet, a local area network (LAN), a wide area network (WAN), a fibre channel (FC) network, and/or any other suitable type of network. Each of the host devices 130 may be a smartphone, a desktop computer, a laptop computer, a tablet, and/or any other suitable type of computing device that is configured to read and write data to the storage system 110. In some implementations, each of the storage processors 112 may have an architecture that is the same or similar to the architecture of the computing device 700, which is shown in FIG. 7.

The storage system 110 may be managed by using management systems 133, 134, and 135. Each of the management systems 133, 134, and 135 may be used to change various configuration settings and/or policies within the storage system 110. An example of aspects of the configuration of management systems 133, 134, and 135 is provided further below with respect to FIGS. 2A-C.

In one aspect, each of the management systems 133, 134, and 135 may be used to set a control window for the storage system 110. As used throughout the disclosure, the term "control window" shall refer to a time period in which one or more configuration settings or policies cannot be modified. A control window can apply across the board to all and any configuration settings or policies of the storage system 110 or, alternatively, it can apply only to one or more specific configuration settings or policies.

As noted above, the system 100 may be distributed geographically and the management systems 133-134 and 135 may be located in different geographic locations. According to the present example, management systems 133 and 134 are located in New York, USA, and management system 135 is located in London, UK. In one aspect, the management systems 133-135 may be arranged to solve a problem that is sometimes experienced by storage administrators of storage systems that are located in different time zones.

The problem is now described as follows. Consider an example in which a storage admin in New York wants to prevent configuration changes to a storage system from occurring within a recurring time window for example 9 am to 5 pm every Monday to Friday. They want to specify the "control window" in their local time zone (EST) and have it be compliant with Daylight Saving Time (DST) so that it does not shift unexpectedly twice a year.

In conventional storage systems, there are a number of problems supporting this use case. Firstly, storage control agents that can be accessed from multiple time locales typically use Coordinated Universal Time (UTC) internally and in their APIs. In general, this works well as a UTC timestamp can easily be converted to local time by a graphical user interface (GUI) or another client. Also, a single point of local time can easily be converted to UTC for API inputs. However, recurring schedules or time windows defined DST local times cannot be simply expressed in UTC. A recurring start time of every Monday at 9 am in New York time maps to various UTC times as the years progress—namely, in addition to the time changing every year from DST to Standard time, the dates in which the transitions between Standard time and Daylight savings time can vary across different years or different countries. Technical constraints of the storage control agent (e.g., Solutions Enabler for PowerMax™) means that making it DST compliant is not feasible in most conventional systems. Normally, the storage control agent is a C agent that must run on a variety of operating systems, including a proprietary OS (e.g., proprietary to the manufacturer of the storage system). The standard C library and other libraries do not offer comprehensive and reliable support for time zones and DST. Supporting the local time zone may be possible on some Operating Systems by leveraging OS features, but the mechanism means that other features and programs running on the OS could be affected, e.g., logging output that is expected to be in terms of UTC may switch to EST.

Secondly, the storage array may be managed by a management application running in another time zone, e.g., London is in BST. The offset between New York local time and London local time is not fixed. In London, DST starts on 27 Mar. 2022, while in New York DST starts two weeks earlier on 13 Mar. 2022. This exacerbates the storage control agent's constraints. At best, the storage control agent can support its local time zone by accessing OS time functionality, but the underlying OS will support only one time zone at a time, so there is no means to support multiple time zones. When supporting DST compliant schedules or windows there are also some anomalies that must be resolved. In terms of local time with DST, each year has one missing hour and one duplicate hour, e.g., in New York there was no 2.30 am on 13 Mar. 2022 and there will be two 1.30 ams on 6 Nov. 2022. Any control windows due to start or finish around those times should be adjusted appropriately.

An example of one possible solution to the problem is now described as follows. A management application (e.g., Unisphere for PowerMax™) may be written in Java and may have a built-in database of time zones and daylight savings times rules. The management application may be the same or similar to the management application 142, which is discussed further below with respect to FIGS. 2A-6. The management application can support multiple time zones concurrently, including daylight savings time rules. It can reliably convert any local time to the correct UTC value and is aware of the dates and times when daylight savings time starts and ends in each time zone. In one example, the solution involves one or more management applications supplying the storage control agent with the initial UTC values for the intended control windows, and maintaining those UTC values so that they move correctly to support the specified local time. The actions performed by the management application may include the initial conversion to UTC values and then correcting the UTC values twice a year as appropriate.

In operation, the user inputs control window details to the management application (e.g., the management application 142). The control window details are persisted in the storage system itself (e.g., the storage system 110). The duration (8 hours) and intended time zone (America/New York) are persisted. The local start time (9 am) and locally applicable days (Monday-Friday) are stored. The local values are converted to their current UTC equivalents. For example, if the user is creating the control window in February, then New York local time is five hours behind UTC, so the UTC values will be converted to UTC start 2 pm, UTC days (Monday-Friday). The agent implementing the control window will continually read the UTC values from the storage array and implement the control window accordingly. The agent may be the same or similar to the agent 144, which is discussed further below with respect to FIGS. 2A-6.

On start-up, a management application reads the time window definitions and starts timers to adjust the UTC values when needed. The management application may be the same or similar to any of the management applications 142, 152, and 162. For example, if the management application starts on 31 Aug. 2022 and reads a time window defined in New York time it will set a timer for the next "fall back" time of 2 am on 6 Nov. 2022. At that time, it will adjust the UTC values so the window stays consistent in terms of local time—i.e., it will increment the UTC start time by 1 hour. This covers the "fall back" daylight savings time change.

The "Spring Forward" case may be more complex, as there is a missing hour in terms of local time. It requires 2 timed operations. The first operation should kick off just before the transition moment (i.e., the transition moment from standard time to daylight savings time). The first operation can adjust the start time (and/or end time) of any control windows due to start after transition instant+1 hour (i.e., any control windows that are scheduled to start 1 hour or longer following the transition instant). For these control windows, the first operation can simply decrement the UTC start time to keep consistent with local time. The first operation can also adjust the start time (and/or end time) of the control windows that are started before the transition instant, as they will have already started correctly. Any local times in the hour immediately after the transition instant should remain unchanged so that those windows don't start too early.

A second operation is required to be performed 1 hour following the transition instant (i.e., the transition moment from standard time to daylight savings time). The second operation involves updating the start times (and/or end times) of control windows that started in the period beginning at the transition instant from standard time to daylight savings time and ending 1 hour following the transition instant. At this, it is safe to update the start times (or end times) of the control windows that started in the hour after the transition instant, as they will have already started correctly. The update may be performed by any control agent and/or control application (rather than being performed only by the application/agent that initially specified the window). If multiple management applications discover the control windows which need to be updated, those management applications will all attempt to maintain the UTC values. This increases reliability; if one management system is offline another will perform the correction. As long as 1 management application is online, the window will be corrected on schedule. If no management applications are online during transition periods, the windows will be corrected as soon as the first management application and/or management system comes online.

Figure 2A:
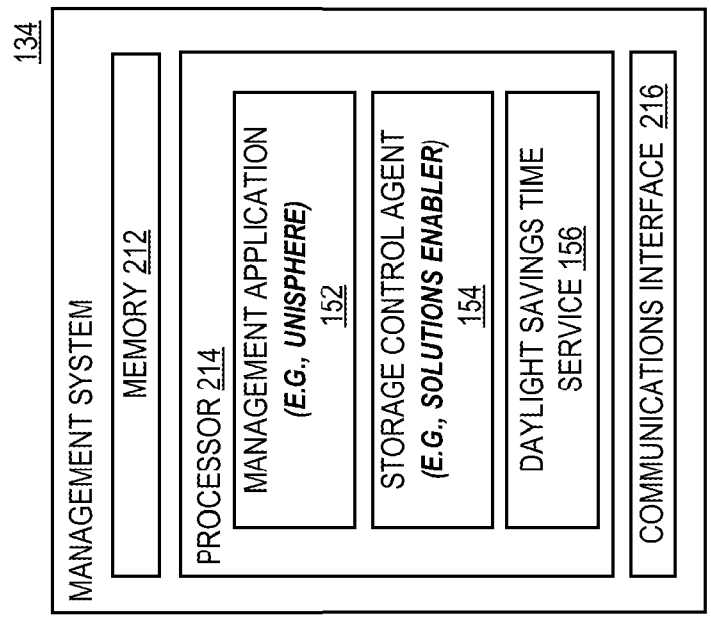
FIG. 2A is a diagram of an example of a management system, according to aspects of the disclosure.

FIG. 2A is a diagram of an example of the management system 133, according to aspects of the disclosure. The management system 133 may include a memory 202, a processor 204, and a communications interface 206. The memory 202 may include any suitable type of non-volatile or volatile memory. For example, the memory 202 may include one or more of a hard disk, a solid-state drive, a random-access memory (RAM), a Synchronous Dynamic Random-Access Memory (SDRAM), and/or any other suitable type of memory. The processor 204 may include one or more of a general-purpose processor (e.g., an x86 processor, a MIPS processor, an ARM processor, etc.), a special-purpose processor, an application-specific integrated circuit (ASIC), a field-programmable gate array (FPGA), and/or any other suitable type of processing circuitry. The communications interface 206 may include one or more of an Ethernet interface, a WiFi interface, a Bluetooth interface, a host bust adapter, and/or any other suitable type of communications interface.

The processor 204 may be configured to execute a management application 142, a storage control agent 144, and a daylight savings time service 146. The management application 142 may be arranged to provide a user interface for a storage administrator to enter various configuration settings of the storage system 110. In some implementations, the management application 142 may include any suitable type of software that is at least in part configured to perform the processes which are discussed further below with respect to FIGS. 4-6. The agent 144 may be configured to act as an interface between the management application 142 and the storage system 110. In some implementations, the agent 144 may include any suitable type of software (or software component) that is at least in part configured to perform the process 300, which is discussed further below with respect to FIG. 3, and/or any of the actions that are discussed further below with respect to FIGS. 4-6. Although, in the present example, the management application 142 and the agent 144 are depicted as separate entities, alternative applications are possible in which they are integrated together. Although, in the present example, the management application 142 and the agent 144 are implemented in software, alternative implementations are possible in which any of the management application 142 and agent 144 is implemented in hardware or as a combination of software and hardware.

The daylight savings time service 146 may include a database that identifies the start and end of daylight savings time for one or more time zones, in each of a plurality of years. As noted above, the days on which daylight savings time starts or ends may vary depending on the time zone and year. The service 146 may be configured to generate an event when daylight savings time starts or ends. This event is herein referred to as "daylight savings time change event"

and it may be generated both when daylight savings time starts or when daylight savings time ends.

Figure 2B:
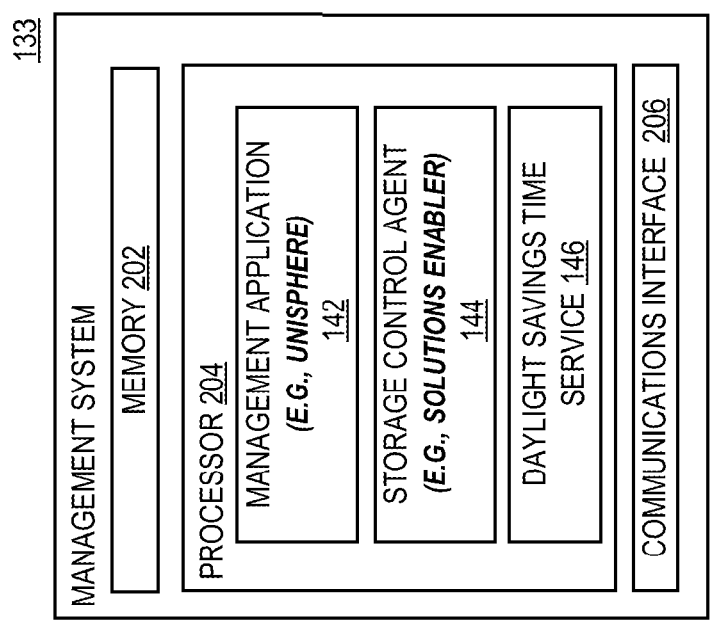
FIG. 2B is a diagram of an example of a management system, according to aspects of the disclosure.

FIG. 2B is a diagram of an example of the management system 134, according to aspects of the disclosure. The management system 134 may include a memory 212, a processor 214, and a communications interface 216. The memory 212 may be the same or similar to the memory 202, the processor 214 may be the same or similar to the processor 204, and the communications interface 216 may be the same or similar to the communications interface 206, all of which are discussed above with respect to FIG. 2A. The processor 224 may be configured to execute a management application 152, a storage control agent 154, and a daylight savings time service 156. The management application 152 may be the same or similar to the management application 142, the agent 154 may be the same or similar to the agent 144, and the service 156 may be the same or similar to the service 146, all of which are discussed above with respect to FIG. 2A.

FIG. 2C is a diagram of an example of the management system 135, according to aspects of the disclosure. The management system 134 may include a memory 222, a processor 224, and a communications interface 226. The memory 222 may be the same or similar to the memory 202, the processor 224 may be the same or similar to the processor 204, and the communications interface 226 may be the same or similar to the communications interface 206, all of which are discussed above with respect to FIG. 2A. The processor 224 may be configured to execute a management application 162, a storage control agent 164, and a daylight savings time service 166. The management application 162 may be the same or similar to the management application 142, the agent 164 may be the same or similar to the agent 144, and the service 166 may be the same or similar to the service 146, all of which are discussed above with respect to FIG. 2A.

FIG. 3 is a flowchart of an example of a process 300, according to aspects of the disclosure. According to the example of FIG. 3, the process 300 is performed by the agent 144. However, the present disclosure is not limited to any specific entity executing the process 300. At step 302, the agent 144 receives, from the management application 142, a definition of a control window and begins to enforce the control window. In one example, the definition of the control window may specify that the control window should start at 9:00 a.m. and end at 5 p.m. on Monday through Friday. In some implementations, the definition may be the same or similar to any of the definitions 504 and 506, which are discussed further below with respect to FIG. 5. In some implementations, the agent 144 may use the control window definition that is received from the management application 142 to set up an active control window definition 610, as discussed further below with respect to FIG. 6. At step 304, the agent 144 receives a re-configuration command from the management application 142 or from a command line interface. The re-configuration command may include any command, instruction, or message, which, if executed by the agent 144, would cause the agent 144 to change at least one configuration setting or policy of the storage system 110. At step 306, the agent 144 determines whether the re-configuration command is received during the control window whose definition is received at step 302. If the re-configuration command is received during the control window, the process 300 proceeds to step 308. Otherwise, if the re-configuration command is received outside of the control window, the process 300 proceeds to step 310. At step 308, the re-configuration command is rejected by the agent 144. At step 310, the re-configuration command is executed by the agent 144.

Figure 4:
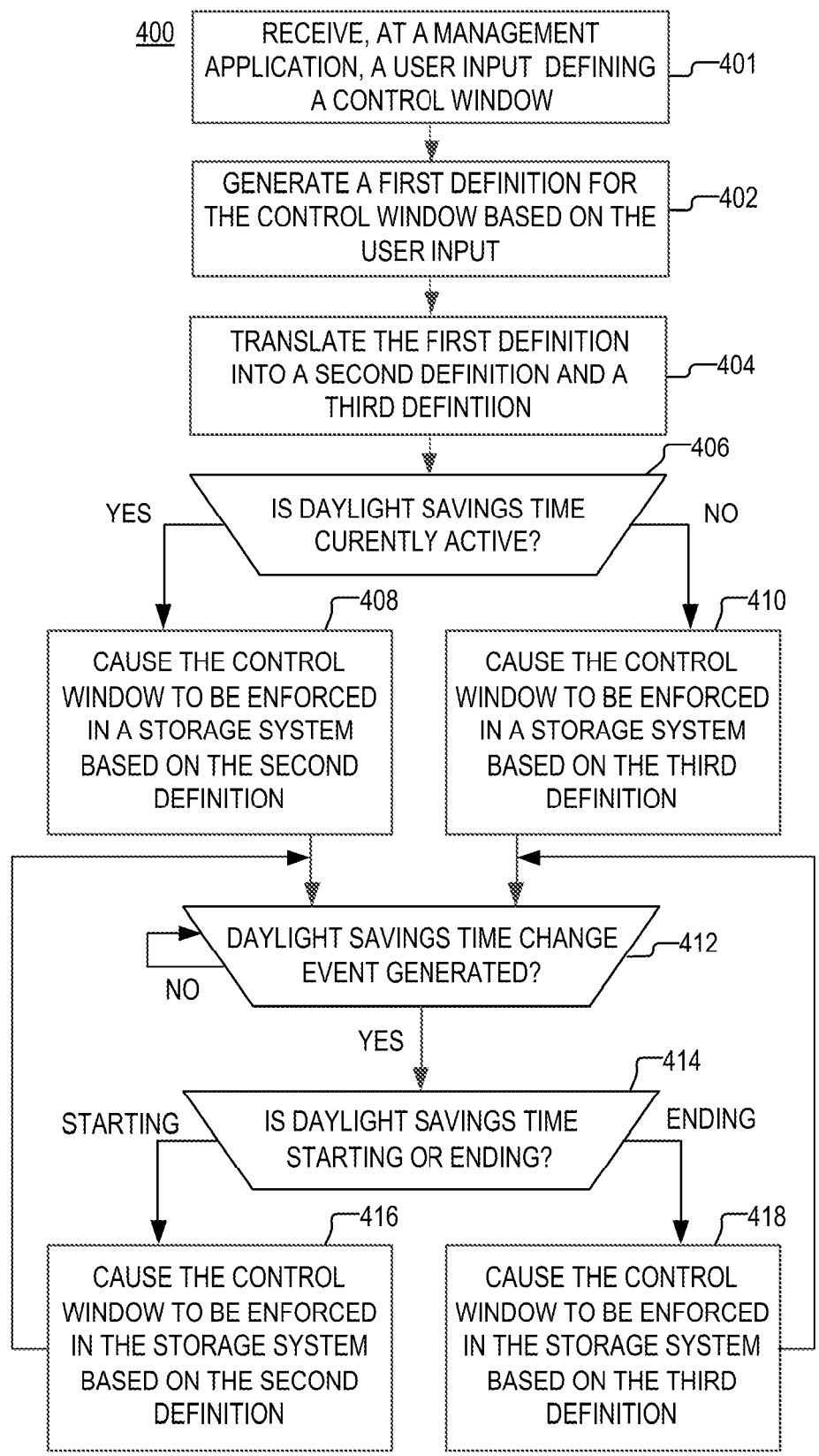
FIG. 4 is a flowchart of an example of a process, according to aspects of the disclosure.

FIG. 4 is a flowchart of an example of a process 400, according to aspects of the disclosure. According to the example of FIG. 4, the process 400 is performed by the management application 142. However, the present disclosure is not limited to any specific entity executing the process 400.

Figure 5:
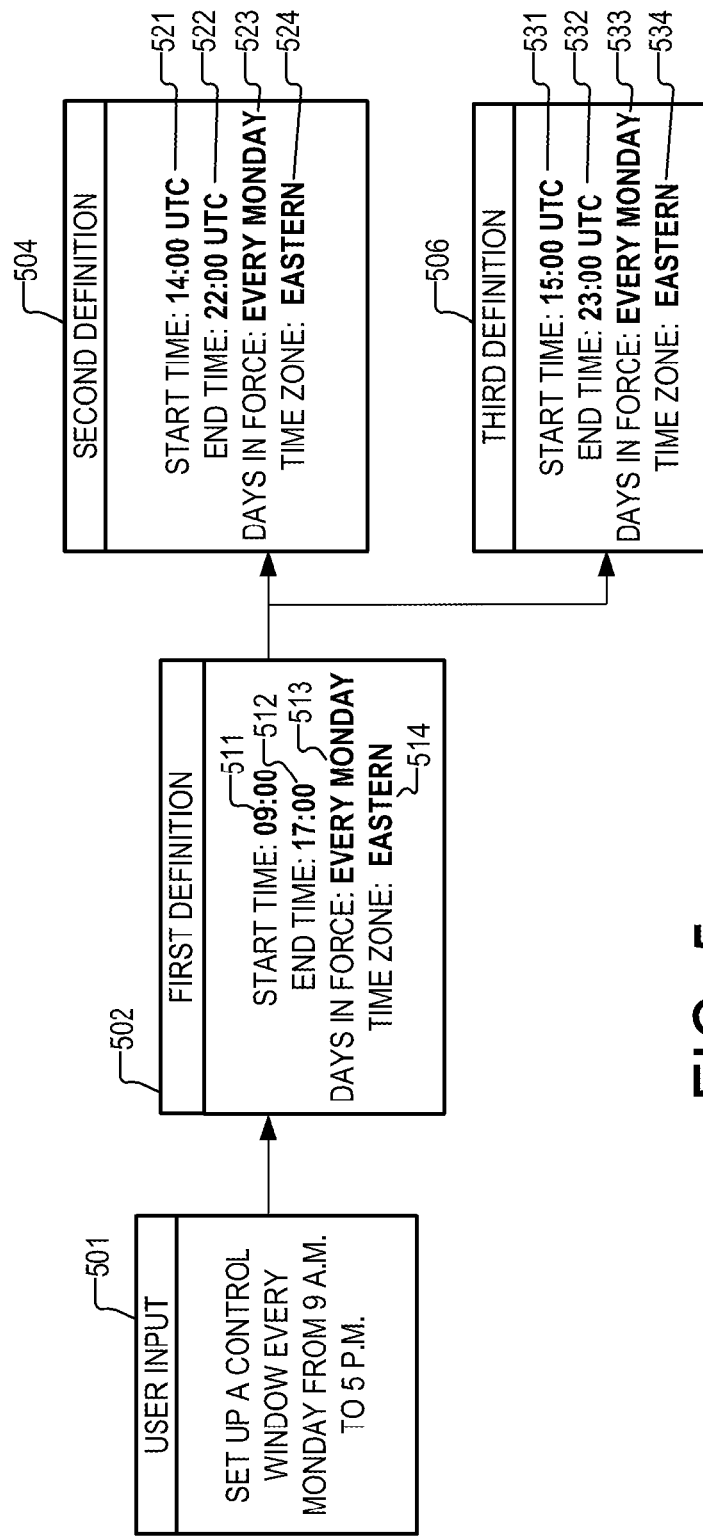
FIG. 5 is a diagram showing examples of different control window definitions, according to aspects of the disclosure.

At step 401, the management application 142 receives a user input defining a control window. In some implementations, the user input may identify one or more of: (i) a start time of the control window, (ii) an end time of the control window, (iii) whether the control window is to be one-off or recurring, (iv) one or more days of the week on which the control window would occur repeatedly or another repetition pattern. In one example, the received user input may be the same or similar to the user input 501, which is shown in FIG. 5.

At step 402, the management application 142 generates a first definition of the control window based on the user input. In some implementations, generating the first definition may include storing the contents of the user input (or a portion thereof) in a predetermined memory location. Additionally or alternatively, in some implementations, generating the first definition may include storing the contents of the user (or a portion thereof) in one or more data structures. Additionally or alternatively, in some implementations, generating the user input may include instantiating one or more data structures that include at least a portion of the contents of the user input. In some implementations, the first definition may be the same or similar to the definition 502, which is shown in FIG. 5.

At step 404, the management application 142 translates the first definition into a second definition and a third definition of the control window. The second definition may be the same or similar to the second definition 504, which is discussed further below with respect to FIG. 5 and the third definition may be the same or similar to the third definition 506, which is also discussed further below with respect to FIG. 5.

At step 406, the management application 142 detects if daylight savings time is currently active in the time zone where the management application 142 and the management system 133 are located. In one example, the management application 142 may identify the date on which the user input is received (at step 401), and determine whether the date falls in the period when daylight savings time is active. If the date falls in the period in which daylight savings time is active, the process 400 proceeds to step 408. Otherwise, the process 400 proceeds to step 410.

At step 408, the management application 142 causes the control window to be enforced in the storage system 110 based on the second definition. In one example, the management application 142 may provide the second definition to the agent 144 along with an instruction for the agent 144 to begin enforcing the control window in accordance with the second definition. Upon receiving the second definition, the control agent may set up an active window definition for the control window in the storage system 110. The active window definition may be the same or similar to the definition 610, which is discussed further below with respect to FIG. 6. The active window definition, at step 408, may be generated based on the second definition. In some implementations, the agent 144 may store copy the start time, end time, days active and/or any other information from the second definition into the definition 610/

At step 410, the management application 142 causes the control window to be enforced in the storage system 110 based on the third definition. In one example, the management application 142 may provide the third definition to the agent 144 along with an instruction for the agent 144 to begin enforcing the control window in accordance with the third definition. Upon receiving the third definition, the control agent may set up an active window definition for the control window in the storage system 110. The active window definition may be the same or similar to the definition 610, which is discussed further below with respect to FIG. 6. The active window definition, at step 410, may be generated based on the third definition. In some implementations, the agent 144 may store copy the start time, end time, days active and/or any other information from the third definition into the definition 610.

At step 412, the management application detects whether a daylight savings time event is generated. As noted above, the daylight savings time event may be generated by the service 146 either when daylight savings time starts or when daylight savings time ends. If a daylight savings time event is generated, the process 400 proceeds to step 414. Otherwise, step 412 is repeated.

At step 414, the management application 142 detects whether daylight savings time is starting or ending. If daylight savings time is starting, the process 400 proceeds to step 416. Otherwise, if daylight savings time is ending, the process 400 proceeds to step 418.

Figure 6:
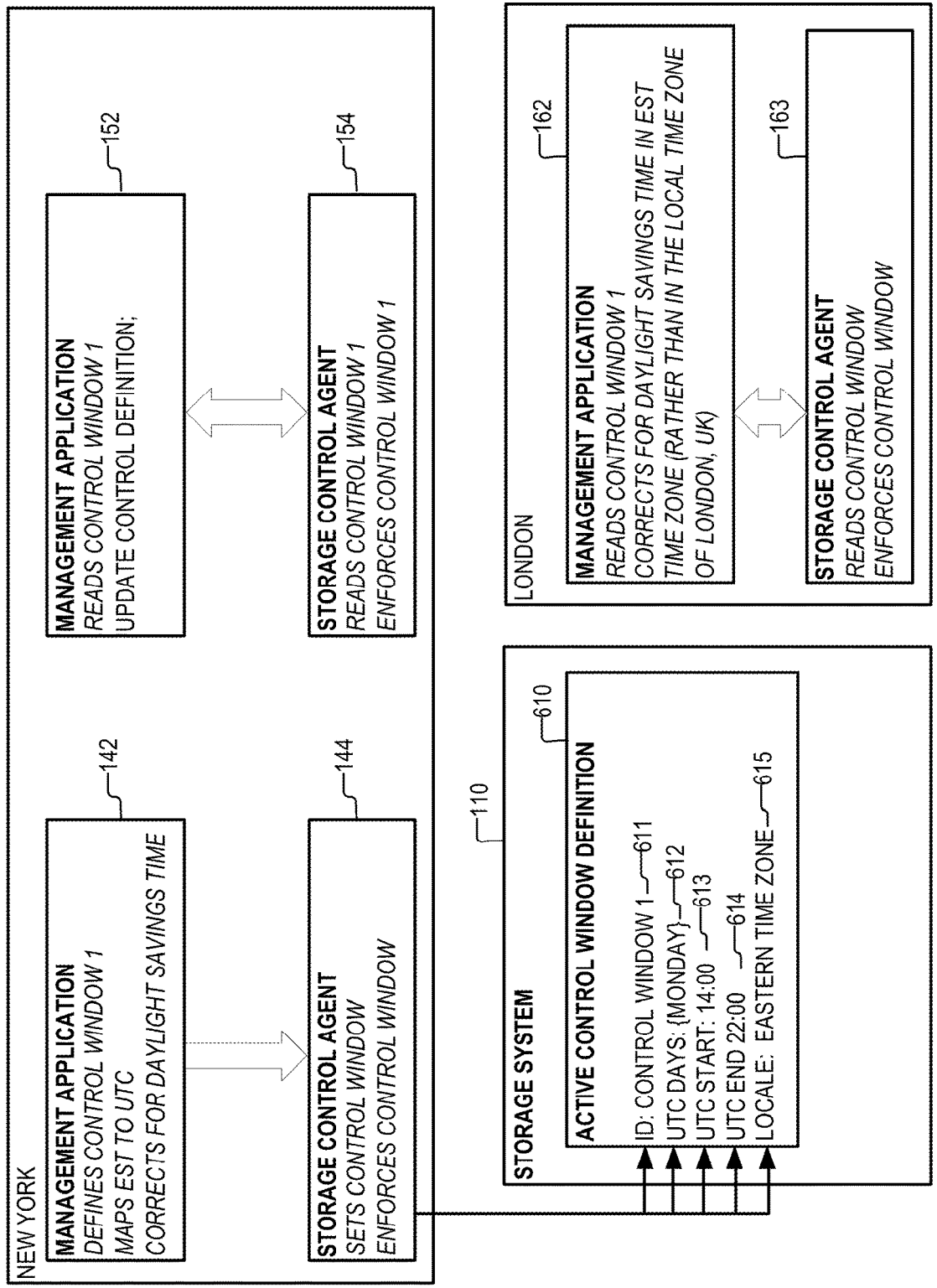
FIG. 6 is a diagram illustrating a mechanism for the definition and use of control windows, according to aspects of the disclosure.

At step 416, the management application 142 causes the control window to be enforced in the storage system 110 based on the second definition. In one example, the management application 142 may provide the second definition to the agent 144 along with an instruction for the agent 144 to begin enforcing the control window in accordance with the second definition. In another example, the management application may provide the agent 144 with an instruction to increment the start and end times for the control window that are currently present in the active definition of the control window (e.g., see active control window definition 610, which is shown in FIG. 6).

At step 418, the management application 142 causes the control window to be enforced in the storage system 110 based on the third definition. In one example, the management application 142 may provide the third definition to the agent 144 along with an instruction for the agent 144 to begin enforcing the control window in accordance with the third definition. In another example, the management application may provide the agent 144 with an instruction to decrement the start and end times for the control window that are currently present in the active definition of the control window (e.g., see active control window definition 610, which is shown in FIG. 6).

FIG. 5 is a diagram illustrating aspects of the operation of the management application 142, in accordance with another example. Specifically, FIG. 5 illustrates an example in which the management application 142 receives a user input 501, generates a first definition 502 based on the user input, and translates the first definition 502 into a second definition 504 and a third definition 506.

The first definition 502 may include an indication of a start time 511 of the control window (i.e., the control window specified at step 401 of the process 400), an indication of the end time 512 of the control window, an indication 513 of one or more days on which the control window is going to be active, and an indication 514 of the time zone where the control window was specified (e.g., the time zone where the management application 142 or management system 133 are located). In the present example, the indication 513 specifies that the control window should be enforced every Monday for an unspecified number of weeks. The start time 511 and the end time 512 are defined according to the time zone where the management application 142 and the management system 133 are located. In other words, in the first definition 502, the start and end times of the control window are defined using either Eastern Standard Time or Eastern Daylight Time (since the management system 133 is located in New York, USA).

The second definition 504 of the control window (i.e., the control window specified at step 401 of the process 400) may be generated based on the first definition 502. The third definition 506 of the control window (i.e., the control window specified at step 401 of the process 400) may be generated based on the first definition 502. One difference between the second and third definitions is that the second definition 504 corresponds to daylight savings time and the third definition 506 corresponds to standard time.

Both of the second and third definitions may express the start time and end time of the control window using Coordinated Universal Time (UTC) and/or another standardized time format that does not observe daylight savings time. As is well known, UTC does not observe daylight savings time and serves as a constant frame of reference to which other time zones are relative. So, when a particular time zone (such as EST or GMT) switches from daylight savings time to standard time, the time in that time zone falls back by an hour relative to the UTC. Similarly, when a particular time zone (such as EST or BST) switches from standard time to daylight savings time, the time in that time zone springs up by an hour relative to UTC.

As indicated above, the user input 501 and the first definition 502 specify that the control window should start at 9:00 a.m. If the user input 501 was received when daylight savings time is active, this would be 9:00 a.m. daylight savings time in the time zone where the user input was received/generated (i.e., the time zone of the management application 142 and/or management system 133). If the user input 501 was received when daylight savings time is inactive, the starting time of the control window would be 9:00 a.m. standard time in the time zone where the user input was received/generated (i.e., the time zone of the management application 142 and/or management system 133).

Moreover, the user input 501 and the first definition 502 specify that the control window should end at 5:00 p.m. If the user input 501 was received when daylight savings time is active, this would be 5:00 p.m. daylight savings time in the time zone where the user input was received/generated (i.e., the time zone of the management application 142 and/or management system 133). If the user input 501 was received when daylight savings time is inactive, the ending time of the control window would be 5:00 p.m. standard time in the time zone where the user input was received/generated (i.e., the time zone of the management application 142 and/or management system 133).

The second definition 504 may include an indication of a start time 521 of the control window, an indication of the end time 522 of the control window, an indication 523 of one or more days of the week on which the control window is going to be active, and an indication 524 of the time zone where the control window was specified (e.g., the time zone where the management application 142 or management system 133 are located). The indication 521 may be generated based on the indication 511. Specifically, the indication 521 may be generated by translating the daylight savings time version of the time identified by indication 511 into UTC time—that is the daylight savings time version in the time zone where the control window is specified. It will be recalled that in the present example, the management application 142 and management system 133 are located in the Eastern Time Zone. Accordingly, the indication 521 may be generated by translating 9:00 EDT to UTC time. The indication 522 may be generated based on the indication 512. Specifically, the indication 522 may be generated by translating the daylight savings time version of the time identified by indication 512 into UTC time. For instance, the indication 522 may be generated by translating 17:00 EDT to UTC time.

The third definition 506 may include an indication of a start time 531 of the control window, an indication of the end time 532 of the control window, an indication 533 of one or more days on which the control window is going to be active, and an indication 534 of the time zone where the control window was specified (e.g., the time zone where the management application 142 or management system 133 are located). The indication 531 may be generated based on the indication 511. Specifically, the indication 531 may be generated by translating the standard time version of the time identified by indication 511 into UTC time—that is the standard time version in the time zone where the control window is specified. It will be recalled that in the present example, the management application 142 and management system 133 are located in the Eastern Time Zone. Accordingly, the indication 531 may be generated by translating 9:00 EST to UTC time. The indication 532 may be generated based on the indication 512. Specifically, the indication 532 may be generated by translating the standard time version of the time identified by indication 512 into UTC time. For instance, the indication 532 may be generated by translating 17:00 EST to UTC time.

FIG. 6 is a diagram illustrating aspects of the operation of the storage system 110. In one aspect FIG. 6 illustrates that the control window (specified at step 401 of the process 400) may be represented in the storage system 110 by an active control window definition 610. The definition 610 may be stored in the memory of one or more of the storage processors 112 and/or in the memory of any other node of the storage system 110. The active control definition 610 may include an identifier 611 of the control window (specified at step 401), an indication 612 of one or more days of every week when the control window would be in force, an indication 613 of the start time of the control window, an indication 614 of the end time of the control window, and an indication 615 of the time zone where the control window was specified (i.e., the location of the management application 142 and/or the management system 133)—hereinafter "the local time zone of the control window". In general, when any of the agents 144, 154, and 164 is started (or restarted), it may read the start time, end time, and active days of the control window from the definition 610 and begin enforcing the control window from the definition 610. When an agent updates the definition 610, the agent may notify other agents that the definition 610 has been updated.

In another aspect, FIG. 6 illustrates functions performed by the management application 142 and the agent 144. As illustrated, the management application 142 may be used to receive user input defining the control window, mapping the times specified by the user from the user's (or application's 142) local time zone to UTC, and performing corrections to the times for daylight savings time. In other words, the management application 142, may receive the user input specifying the control window (e.g., see step 401 of process 400), and generate definitions for the control window that corresponds to daylight savings time and standard time (e.g., see step 404 of process 400). The agent 144 may receive a control window definition for the management application and cause the control window to be enforced in accordance with the received control window definition. Specifically, the agent 144 may instantiate the active control window definition 610, assign the identifier 611 to the control window, and set the values of indications 612, 613, 614, and 615 to be the same as (or otherwise indicative) of the information that is contained in the received control window definition. For example, when the received control definition is the second definition 504 (shown in FIG. 5), the agent 144 may set the value of indication 612 to be the same or otherwise based on the value of indication 523; set the value of indication 613 to be the same as or otherwise based on indication 521; set the value of indication 614 to be the same as or otherwise based on indication 522; set the value of indication 615 to be the same as otherwise based on indication 524. After the definition 610 is set, the agent 144 may enforce the control window as discussed above with respect to steps 304-310 of the process 330.

In yet another aspect, FIG. 6 illustrates functions performed by the management application 152 and the agent 154. As illustrated, when first started, the management application 152 may retrieve the definition 610 of the control window through the agent 154. Afterwards, the management application may determine if the control window needs to be updated and update the definition 610 if needed. Specifically, the management application 152 may determine whether the local time zone of the control window has switched (or is about to switch) from daylight savings time to standard time or vice versa. Next, the management application 152 may determine if the definition 610 has been updated to reflect the switch from daylight savings time to standard time. Next, if the definition has not been updated, the management application may update the definition. For example, if the time has changed (or is about to change) from daylight savings time to standard time, the management application 152 may use the agent 154 to decrease the values of indications 613 and 614 by 1 hour. On the other hand, if the time has changed (or is about to change) from standard time to daylight savings time, the management application 152 may increase the values of indications 613 and 614 by 1 hour. In some implementations, the increase may be performed using the two-step process that is discussed above—namely, at the instant when the transition happens, control windows that begin 1 hour after the transition or before the transition may be updated, while the control windows that begin in the period starting at the instant when the transition occurs and lasting 1 hour following the transition may be updated after 1 hour following the transition has passed. The agent 154 may be used by the management application 152 to retrieve, modify and store data in the definition 610. In addition, the agent 154 may enforce the control window as discussed above with respect to steps 304-310 of the process 300.

In yet another aspect, FIG. 6 illustrates functions performed by the management application 162 and the agent 164. As illustrated, when first started, the management application 162 may retrieve the definition 610 of the control window through the agent 164. Afterwards, the management application may determine if the control window needs to be updated and update the definition 610 accordingly if needed. Specifically, the management application 162 may determine whether the local time zone of the control window has switched (or is about to switch) from daylight savings time to standard time or vice versa. Next, the management application 162 may determine if the definition 610 has been updated to reflect the switch form daylight savings time to standard time. Next, if the definition has not been updated, the management application may update the definition. For example, if the time has changed (or is about to change) from daylight savings time to standard time, the management application 162 may use the agent 164 to decrease the values of indications 613 and 614 by 1 hour. On the other hand, if the time has changed (or is about to change) from standard time to daylight savings time, the management application 162 may increase the values of indications 613 and 614 by 1 hour. In some implementations, the increase may be performed using the two-step process that is discussed above—namely, at the instant when the transition happens control windows that begin 1 hour after the transition or before the transition may be updated, while the control windows that begin in the period starting at the instant when the transition occurs and lasting 1 hour following the transition may be updated after 1 hour following the transition has passed. It should be noted that even though management application is based in London, it updates the definition 610 in response to daylight savings time changes in New York—New York being the local time zone of the control window. The agent 164 may be used by the management application to retrieve, modify and store data in the definition 610. In addition, the agent 164 may enforce the control window as discussed above with respect to steps 304-310 of the process 300.

Referring to FIG. 7, in some embodiments, a computer 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 709 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704 to perform at least a portion of 600-900. Program code may be applied to data entered using an input device of GUI 709 or received from I/O device 720.

FIGS. 1-7 are provided as an example only. The term "indication" as used throughout the disclosure may refer to a number, a character, a string, or an alphanumerical string. When permitted by context, the term "indication" may be synonymous with "variable" and vice versa. At least some of the steps discussed with respect to FIGS. 1-7 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments (1/17).

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
    receiving, at a management application, a first definition of a control window, the first definition specifying the control window in a local time of a time zone where the management application is being executed, wherein the first definition identifies: (i) a first start time for the control window, (ii) a first end time for the control window, and (iii) one or more days of the week when the control window should be enforced;
    detecting an applicable time in the time zone, the applicable time being one of standard time or daylight savings time;
    generating a second definition of the control window that corresponds to the applicable time, the second definition specifying the control window in a standardized time format, the second definition being generated based on the first definition;
    causing the control window to be enforced in a storage array in accordance with the second definition;
    detecting an event indicating that the applicable time, in the time zone, will change to a new applicable time, the new applicable time being the other one of standard time and daylight savings time; and
    in response to the event, stopping to enforce the control window in the storage array in accordance with the second definition and causing the control window to be enforced in the storage array in accordance with a third definition of the control window, the third definition being in the standardized time format.

2. The method of claim 1, wherein the event is generated by the management application or another service that is executed on a same management system as the management application.

3. The method of claim 1, wherein the standardized time format includes Coordinated Universal Time (UTC).

4. The method of claim 1, further comprising generating the third definition of the control window, the third definition being generated based on at least one of the first definition or the second definition.

5. The method of claim 1, wherein the event is generated by using a service that is configured to identify the start date and the end date of daylight savings time in each of a plurality of years.

6. The method of claim 1, wherein causing the control window to be enforced in the storage array in accordance with the second definition includes, providing, to a gateway agent, a second start time that is part of the second definition and a second end time that is part of the second definition.

7. The method of claim 6, wherein causing the control window to be enforced in the storage array in accordance with the third definition includes, providing, to the gateway agent, a third start time that is part of the third definition and a third end time that is part of the third definition.

8. The method of claim 1, wherein the control window is represented in the storage array by at least a first variable and a second variable, and causing the control window to be enforced in the storage array in accordance with the second definition includes setting the first variable to equal a second start time that is generated based on the first start time, and setting the second variable to equal a second end time that is generated based on the first end time.

9. The method of claim 8, wherein stopping to enforce the control window in accordance with the second definition and causing the control window to be enforced in accordance with the third definition includes setting the first variable to equal a third start time that is generated based on the first start time and setting the second variable to equal a third end time that is generated based on the first end time.

10. A system comprising:
    a memory; and
    at least one processor that is operatively coupled to the memory, the at least one processor being configured to perform the operations of:
        receiving, at a management application, a first definition of a control window, the first definition specifying the control window in a local time of a time zone where the management application is being executed, wherein the first definition identifies: (i) a first start time for the control window, (ii) a first end time for the control window, and (iii) one or more days of the week when the control window should be enforced;
        detecting an applicable time in the time zone, the applicable time being one of standard time or daylight savings time;
        generating a second definition of the control window that corresponds to the applicable time, the second definition specifying the control window in a standardized time format, the second definition being generated based on the first definition;
        causing the control window to be enforced in a storage array in accordance with the second definition;
        detecting an event indicating that the applicable time, in the time zone, will change to a new applicable time, the new applicable time being the other one of standard time and daylight savings time; and
        in response to the event, stopping to enforce the control window in the storage array in accordance with the second definition and causing the control window to be enforced in the storage array in accordance with a third definition of the control window, the third definition being in the standardized time format.

11. The system of claim 10, wherein the event is generated by the management application or another service that is executed on a same management system as the management application.

12. The system of claim 10, wherein the standardized time format includes Coordinated Universal Time (UTC).

13. The system of claim 10, wherein the at least one processor is further configured to perform the operation of generating the third definition of the control window, the third definition being generated based on at least one of the first definition or the second definition.

14. The system of claim 10, wherein the event is generated by using a service that is configured to identify the start date and the end date of daylight savings time in each of a plurality of years.

15. The system of claim 10, wherein causing the control window to be enforced in the storage array in accordance with the second definition includes, providing, to a gateway agent, a second start time that is part of the second definition and a second end time that is part of the second definition.

16. The system of claim 15, wherein causing the control window to be enforced in the storage array in accordance with the third definition includes, providing, to the gateway agent, a third start time that is generated based on the first start time and a third end time that is generated based on the first end time.

17. The system of claim 10, wherein the control window is represented in the storage array by at least a first variable and a second variable, and causing the control window to be enforced in the storage array in accordance with the second definition includes setting the first variable to equal a second start time that is generated based on the first start time, and setting the second variable to equal a second end time that is generated based on the first end time.

18. The system of claim 17, wherein stopping to control the control window in accordance with the second definition and causing the control window to be enforced in accordance with the third definition includes setting the first variable to equal a third start time that is generated based on the first start time and setting the second variable to equal a third end time that is generated based on the first end time.

19. A non-transitory computer-readable medium storing one or more processor-executable instructions, which, when executed by at least one processor, cause the at least one processor to perform the operations of:
receiving, at a management application, a first definition of a control window, the first definition specifying the control window in a local time of a time zone where the management application is being executed, wherein the first definition identifies: (i) a first start time for the control window, (ii) a first end time for the control window, and (iii) one or more days of the week when the control window should be enforced;
detecting an applicable time in the time zone, the applicable time being one of standard time or daylight savings time;
generating a second definition of the control window that corresponds to the applicable time, the second definition specifying the control window in a standardized time format, the second definition being generated based on the first definition;
causing the control window to be enforced in a storage array in accordance with the second definition;
detecting an event indicating that the applicable time, in the time zone, will change to a new applicable time, the new applicable time being the other one of standard time and daylight savings time; and
in response to the event, stopping to enforce the control window in the storage array in accordance with the second definition and causing the control window to be enforced in the storage array in accordance with a third definition of the control window, the third definition being in the standardized time format.

20. The non-transitory computer-readable medium of claim 19, wherein the event is generated by the management application or another service that is executed on a same management system as the management application.

* * * * *